(12) United States Patent
Amine et al.

(10) Patent No.: US 8,787,900 B2
(45) Date of Patent: Jul. 22, 2014

(54) METHODS AND SYSTEMS FOR TESTING CELL PHONES WITH MULTIPLE ANTENNAS

(75) Inventors: Arashk Mahjoubi Amine, Monroe, NJ (US); Randy Oltman, Tinton Falls, NJ (US); Madhusudhan Gurumurthy, Sea Bright, NJ (US); Charles Zheng, Bridgewater, NJ (US); Joe Willis, Carteret, NJ (US)

(73) Assignee: Spirent Communications, Inc., Sunnyvale, CA (US)

( * ) Notice: Subject to any disclaimer, the term of this patent is extended or adjusted under 35 U.S.C. 154(b) by 856 days.

(21) Appl. No.: 12/625,180

(22) Filed: Nov. 24, 2009

(65) Prior Publication Data

US 2011/0124295 A1 May 26, 2011

(51) Int. Cl.
*H04W 24/00* (2009.01)
(52) U.S. Cl.
USPC .......... 455/423; 455/424; 455/425; 455/446; 455/67.11; 455/115.1; 455/226.1
(58) Field of Classification Search
CPC .................................................. H04W 24/06
USPC .......... 455/423, 424, 425, 446, 67.11, 115.1, 455/226.1
See application file for complete search history.

(56) References Cited

U.S. PATENT DOCUMENTS

| 6,571,082 | B1 * | 5/2003 | Rahman et al. | 455/67.11 |
|---|---|---|---|---|
| 7,508,868 | B2 * | 3/2009 | Chang | 375/224 |
| 7,715,844 | B2 * | 5/2010 | Bi et al. | 455/446 |
| 2003/0124982 | A1 * | 7/2003 | Saari et al. | 455/67.4 |
| 2004/0259554 | A1 * | 12/2004 | Rappaport et al. | 455/446 |
| 2006/0229020 | A1 * | 10/2006 | Mlinarsky et al. | 455/67.14 |
| 2007/0243826 | A1 * | 10/2007 | Liu | 455/67.11 |
| 2008/0139195 | A1 * | 6/2008 | Marsyla et al. | 455/423 |
| 2009/0094492 | A1 * | 4/2009 | Music et al. | 714/715 |

OTHER PUBLICATIONS

Rumney, Moray, "LTE and the Evolution to 4G Wireless: Design and Measurement Challenges," Agilent Technologies Publication, 2009, pp. 199-411.
"Moving Forward to What's Possible in LTE," Agilent Technologies, Inc., Mar. 16, 2009, pp. 1-12, accessed at http://www.agilent.com/find/lte.
"Agilent 3GPP Long Term Evolution: System Overview, Product Development, and Test Challenges," Application Note, Agilent Technologies, Inc., Sep. 8, 2009, pp. 1-92, accessed at http://www.agilent.com/find/LTE.
"E6620 Wireless Communications Test Set," Agilent Technologies, Inc., Jun. 8, 2009, pp. 1-12, accessed at http://www.agilent.com/find/8960devicedesign.
Technical White Paper, "Long Term Evolution (LTE): A Technical Overview," Motorola, Inc., 2007, pp. 1-15, accessed at www.motorola.com.
Narandzic, Milan et al., "Comparison of SCM, SCME, and WINNER Channel Models," IEEE, 2007, pp. 413-417.

\* cited by examiner

*Primary Examiner* — Wen Huang
(74) *Attorney, Agent, or Firm* — Yiding Wu; Haynes Beffel & Wolfeld LLP (57) ABSTRACT

The present invention relates to testing cell phones that simulates network conditions. In particular, it relates to new testing capabilities for simulating changes in correlation characteristics of signal components delivered to a cell phone. Correlation characteristics express changing environmental conditions and physical relationships among antennas in the cell phone and at base stations.

25 Claims, 10 Drawing Sheets

| 1.0000 + 0.0000j | 0.0000 + 0.0000j | 0.0000 + 0.0000j | 1.0000 + 0.0000j |
|---|---|---|---|
| 0.0000 + 0.0000j | 1.0000 + 0.0000j | 0.0000 + 0.0000j | 0.0000 + 0.0000j |
| 0.0000 + 0.0000j | 0.0000 + 0.0000j | 1.0000 + 0.0000j | 0.0000 + 0.0000j |
| 0.0000 + 0.0000j | 0.0000 + 0.0000j | 0.0000 + 0.0000j | 1.0000 + 0.0000j |

| 1.0000 + 0.0000j | 0.0000 + 0.0000j | 0.5000 + 0.0880j | 0.0000 + 0.0000j |
|---|---|---|---|
| 0.0000 + 0.0000j | 1.0000 + 0.0000j | 0.0000 + 0.0000j | -0.5000 - 0.0880j |
| 0.5000 - 0.0880j | 0.0000 + 0.0000j | 1.0000 + 0.0000j | 0.0000 + 0.0000j |
| 0.0000 + 0.0000j | -0.5000 + 0.0880j | 0.0000 + 0.0000j | 1.0000 + 0.0000j |

| 1.0000 + 0.0000j | 0.0000 + 0.0000j | 0.7264 + 0.0000j | 1.0000 + 0.0000j |
|---|---|---|---|
| 0.0000 + 0.0000j | 1.0000 + 0.0000j | 0.0000 + 0.0000j | -0.7264 + 0.0000j |
| 0.7264 + 0.0000j | 0.0000 + 0.0000j | 1.0000 + 0.0000j | 0.0000 + 0.0000j |
| 0.0000 + 0.0000j | -0.7264 + 0.0000j | 0.0000 + 0.0000j | 1.0000 + 0.0000j |

| 1.0000 + 0.0000j | -0.2366 + 0.4312j | 0.6883 + 0.1211j | -0.2151 + 0.2681j |
|---|---|---|---|
| -0.2366 - 0.4312j | 1.0000 + 0.0000j | -0.1106 - 0.3254j | 0.6883 + 0.1211j |
| 0.6883 - 0.1211j | -0.1106 + 0.3254j | 1.0000 + 0.0000j | -0.2366 + 0.4312j |
| -0.2151 - 0.2681j | 0.6883 - 0.1211j | -0.2366 - 0.4312j | 1.0000 + 0.0000j |

| 1.0000 + 0.0000j | 1.0000 + 0.0000j | 1.0000 + 0.0000j | 1.0000 + 0.0000j |
|---|---|---|---|
| 1.0000 + 0.0000j | 1.0000 + 0.0000j | 1.0000 + 0.0000j | 1.0000 + 0.0000j |
| 1.0000 + 0.0000j | 1.0000 + 0.0000j | 1.0000 + 0.0000j | 1.0000 + 0.0000j |
| 1.0000 + 0.0000j | 1.0000 + 0.0000j | 1.0000 + 0.0000j | 1.0000 + 0.0000j |

METHODS AND SYSTEMS FOR TESTING CELL PHONES WITH MULTIPLE ANTENNAS

BACKGROUND OF THE INVENTION

The present invention relates to testing cell phones in a lab that simulates environmental conditions. In particular, it relates to new testing capabilities for simulating changes in correlation characteristics of signal components delivered to a cell phone. Correlation characteristics express changing environmental conditions and physical relationships among antennas in the cell phone and at base stations.

New cell phone designs require testing, especially as new network features and designs are introduced. Network operators, phone manufacturers and others need test equipment to assure that new phone models function smoothly.

The so-called long-term evolution (LTE) of cellular networks from third to fourth generation technology presents new challenges for testing. An overview of testing approaches to LTE can be found in M. Rumney, ed., LTE and the Evolution to 4G Wireless, Chapters 6-7 at 199-426 (Wiley 2009). As comprehensive as this discussion is, the topic of multipathing is not even listed in the index to the book.

The evolutionary plan calls for cell phones and base stations each to have multiple antennas. Processors in the phones and base stations will sense the phase difference between antennas and adjust their signal processing to take into account the physical relationship among the antennas at each end. At various cellular frequencies, the wavelength may be more or less than 1 foot. Significant phase differences can easily exist with such short wavelengths.

Standards have developed for cell phones with incoming signals that have testing phase differences, especially for types of multipathing encountered in different environments. Standards preparation efforts related to testing that extend to multipathing include 3GPP's so-called Spatial Channel Models (at www.3gpp.org) and the European Information Society Technologies' ("IST") WINNER project (at www.ist-winner.org). We collectively refer to these efforts to describe operating environments as propagation channel models ("PCMs"). Referring to environmental conditions as propagation channel models allows us to refer to and explain classic channel models and spatial channel models without confusion between environments that are being modeled and the mathematics used by the model.

The standard multipathing environments do not attempt to model the dynamics of a person turning their head as they talk or of driving on the freeway or moving from one environment to another during a call. One approach to the person turning their head test is to mount a cell phone in RF chamber attached to a robot that moves the cell phone and simulated body parts, a hand and head. Approaches to so-called drive testing include fading the signal and actually driving with an instrumented cell phone. Testing approaches have yet to develop for the corner case of a cell phone moving from one environment to another during a call. Existing test protocols are not adequate to fully test the next generation of phones and networks.

An opportunity arises to introduce improved test equipment that handles scenarios which did not arise with prior generations of cell phones and networks or that were inadequately tested.

SUMMARY OF THE INVENTION

The present invention relates to testing cell phones in a lab that simulates environmental conditions. In particular, it relates to new testing capabilities for simulating changes in correlation characteristics of signal components delivered to a cell phone. Correlation characteristics express changing environmental conditions and physical relationships among antennas in the cell phone and at base stations. Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

LTE (Lone Term Evolution)

LTE (Long Term Evolution) describes a "4G" (sometimes labeled 3.9G) radio access technology that will deliver subscribers the benefits of faster, lower latency data access and new services through a new simplified air interface that's optimized for IP-based traffic. Driven by the UMTS standards bodies, LTE is the natural evolution for UMTS (GSM/W-CDMA) network operators. LTE, with its advanced multiple antenna schemes and modulations, promises significant performance enhancements over 3G, with a target of being able to squeeze two to four times more data capacity in the same amount of spectrum. The "flat" all-IP architecture also simplifies interworking with fixed networks. LTE will be used for mobile, fixed and portable wireless broadband access.

Consistent with WiMAX, the LTE specification contains various flavors of MIMO and beam-forming. The drivers for LTE are similar to those for WiMAX.

Some testing features that are being applied to LTE ahead of WiMAX include: dynamic emulation of the MIMO environment with variable correlations; playback of fading data from simulation software or the real environment; and support for SCME and WINNER channel models. See Baum, D. S., et al. "An Interim Channel Model for Beyond-3G Systems: Extending the 3GPP Spatial Channel Model (SCM)." Proceedings of the 61st IEEE Vehicular Technology Conference (VTC '05). 2005; Kyösti, P., J. Meinilä, et al. "IST-4-027756 WINNER II, Deliverable D1.1.2, "WINNER II Channel Models, Part I Channel Models."" 2007; Narandžic, M., et al. "Comparison of SCM, SCME, and WINNER Channel Models." Proceedings of the IEEE Vehicular Technology Conference. 2007. These three references are hereby incorporated by reference to provide background and to illustrate the level of skill in the art. The 3GPP SCMs are defined as Suburban Macro, Urban Macro and Urban Micro. The later-developed WINNER II models are defined for indoor office/residential, indoor to outdoor, typical urban micro-cell, bad urban micro-cell, large indoor hall, outdoor to indoor microcell, line of sight feeder for rooftop to rooftop, line of sight feeder for street-level to street-level, line of sight feeder for below rooftop to street-level, non-line of sight feeder for above rooftop to street-level, non-line of sight fixed feeder links for one terminal at near rooftop, suburban, typical urban macro-cell, bad urban macro-cell, outdoor to indoor macro-cell, rural macro-cell, and moving networks.

It is anticipated that the first implementations of LTE technology in 2011 will be for data, such as data cards for laptops. Voice implementation and data with voice implementations will follow.

For these implementations of LTE, so-called classical channel models can be used for testing, rather than the more complicated spatial channel models. The spatial channel models are sometimes exercised to create power and delay parameters of the classical channel models, which can be expressed as complex numbers. During testing, the correlation matrices of power and delay parameters can be applied to a test signal with less complexity than applying the complex calculations that involve angles, spreads and additional parameters.

Testing System Configurations

Spirent manufactures test equipment for cellular networks. One test components is the Channel emulator. Spirent's workhorse Channel emulator is the SR5500. The function of the Channel emulator is to modify a test signal to emulate the physical characteristics of a real world cellular signal, including instantaneous values of phase (quadrature), delay, and amplitude (strength), to represent real world phenomena including multipathing. Correlation matrices modify these instantaneous values by applying delay and power factors to a classical channel model. This is practical on current hardware. In the future, it may become practical for correlation matrices to express parameters of a true spatial channel model. For now, we are using the classical channel model for real time calculations. One capability of the channel emulator is to simulate up to 24 paths that a signal may follow to arrive in any cell phone or base station.

Modifying the phase, delay and amplitude of a test signal to emulate 24 signal paths is a sophisticated computing problem. The hardware in the channel emulator includes digital signal processor(s) (DSPs) and field programmable gate arrays (FPGAs). The FPGAs in the SR5500 process multiple complex correlation matrices to create a channel emulation for a test signal. An FPGA configuration that is adapted to switch among complex correlation matrices is described below.

The channel emulator is one of the system components that go into an overall test system. A variety of test system configurations may be select. We describe two of the many alternatives to differ primarily by the structure of the LTE emulator.

Figure 1:
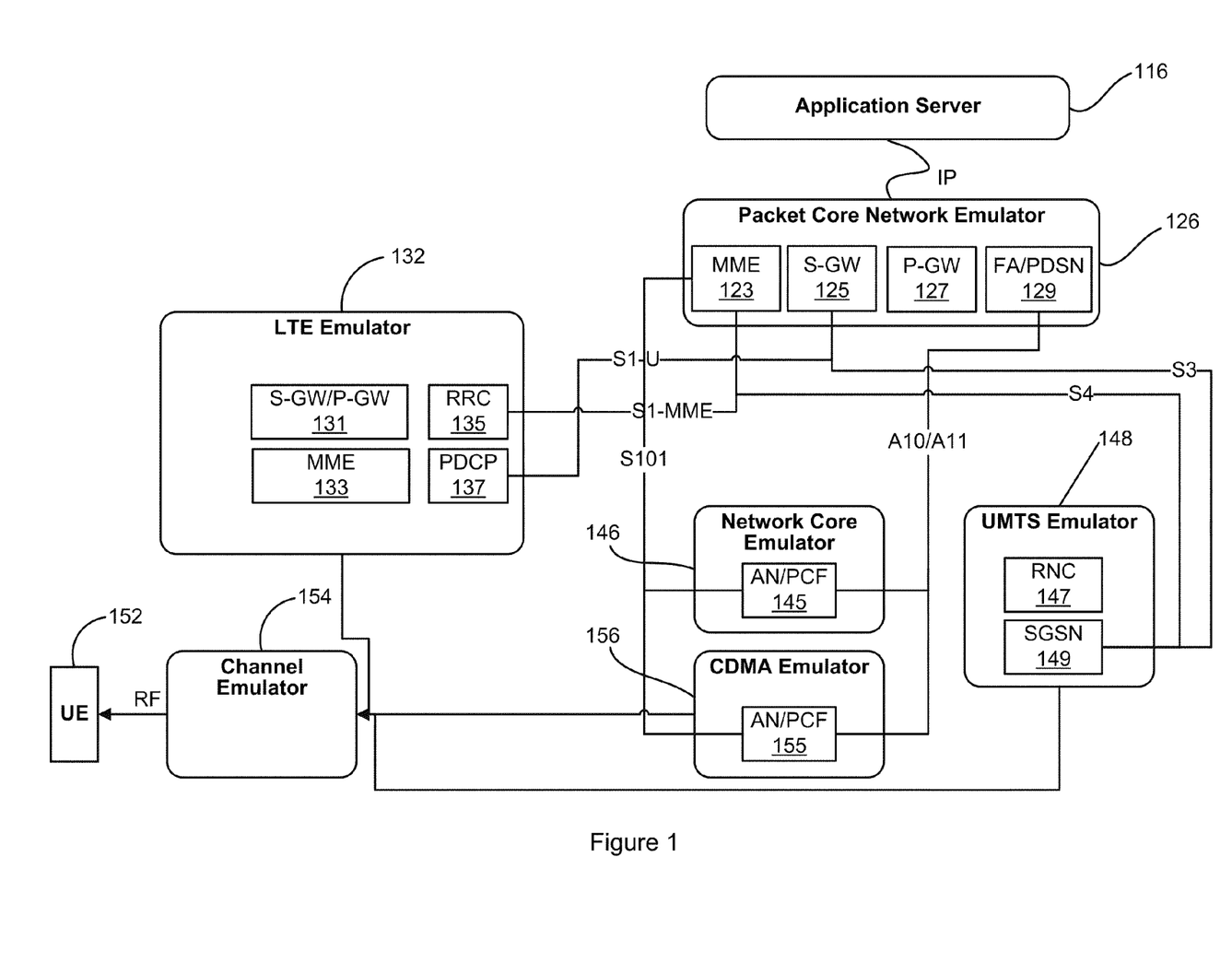
FIG. 1 is a high-level block diagram of a system that includes an application server, a packet core network emulator, network core emulator, LTE emulator, UMTS emulator and CDMA emulator.

FIG. 1 is a high level block diagram of an application server 116, a packet core network emulator 126, network core emulator 146, LTE emulator 132, UMTS emulator 148 and CDMA emulator 156. Signals generated by the various emulators 132, 148, 156 pass through the channel emulator 154, which supplies the radio frequency feed to the user equipment 152.

The application server 116 provides a graphic user interface and may be coupled to the packet core network emulator 126 by IP over Ethernet. The packet core network emulator supports a number of functions and protocols, some of which are indicated. The indicated components are the mobility management entity 123, a serving gateway 126, a packet data network gateway 127 and a foreign agent/packet data serving node 129. One test component that can, as of submission of this disclosure, serve as a packet core network emulator is Spirent's SR3610. The packet core network emulator is coupled to a network core emulator 146 and to a CDMA emulator 156, each of which includes an access network/packet control function 145, 155. Test components that can, as of submission of this disclosure, serve as a network core and CDMA emulators are Spirent's SR3462 and 3452. The packet core network emulator also is coupled to a UMTS emulator 148 that includes radio network controller 147 and serving GPRS support 149 components.

The LTE emulator 132 is coupled to the packet core network emulator 126 and the UMTS emulator 148. The LTE emulator 132 may include components such as serving and packet data network gateways 131, a mobility management entity 133, a radio resource control 136 and a packet data convergence protocol component 137. The LTE standard uses multiple antennas, as does WCDMA/UMTS, which are emulated using the disclosed technology.

The LTE emulator, CDMA emulator and UMTS emulator are coupled to the channel emulator 154. The LTE, CDMA and UMTS emulators generate signals that are placed in the emulated channels, modified and passed as one or more RF signals to the user equipment 152.

Figure 2A:
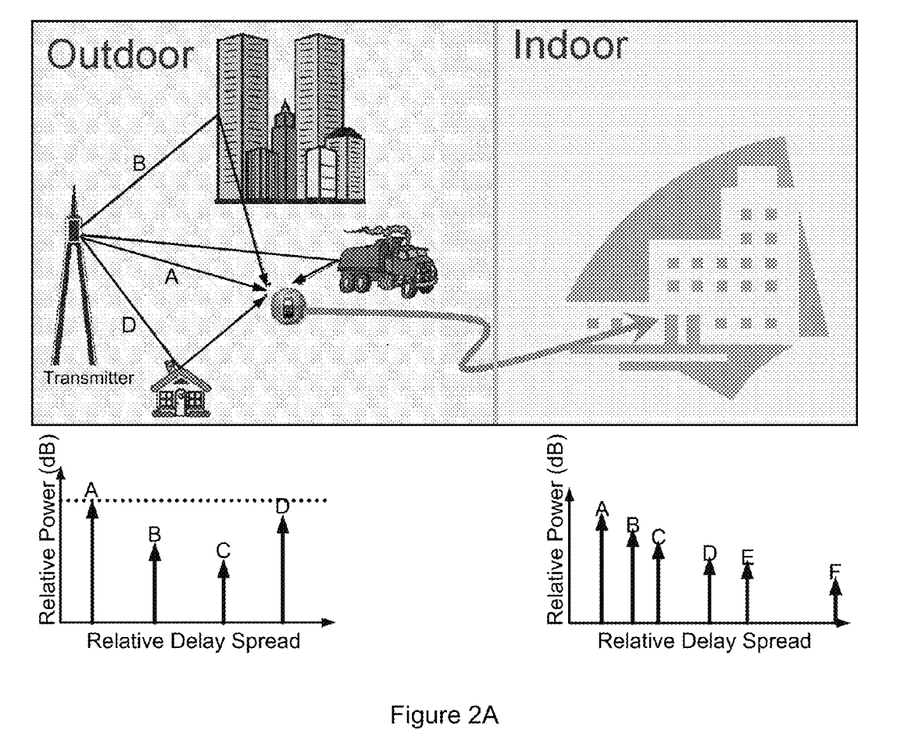
FIGS. 2A-B illustrate changing environmental and spatial correlation conditions of a cell phone in motion.

FIG. 2A depicts movement of a cell phone from one environment to another and changes in the surroundings that influence multipathing. In this figure, the user begins out of doors, where a cell phone signal may be reflected from small and large buildings, moving vehicles and other urban or rural features. The cell phone may be moving in a car, which impacts the rate at which paths from the base stations to the cell phone change.

Figure 2B:
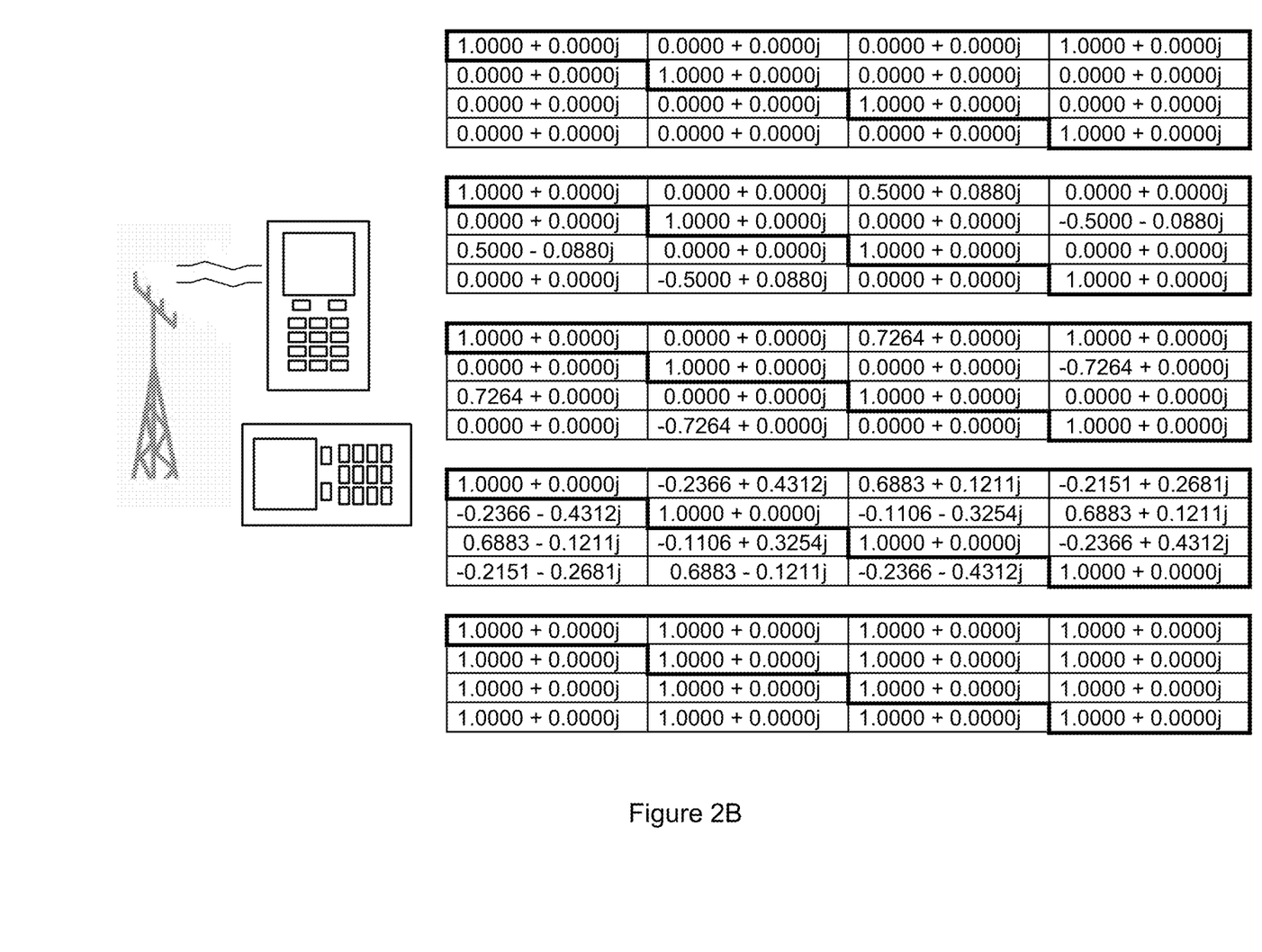

FIG. 2B depicts the impact of reorienting a cell phone on correlation coefficient matrices. (The values illustrated in the matrices are illustrative only, not intended to reflect any particular test or environment.) In a vertical orientation, for instance, there may be sufficient delay between a first and second antennas of the cell phone to process them separately, as uncorrelated signals. As the cell phone rotates, the difference in distance between the cell phone antennas and the base station changes. In this example, when the top of the cell phone is pointed at the base station, the antennas are essentially the same distance from the transmitting antennas and the signals received become highly correlated. In these circumstances, the cell phone may switch from using its antennas in a MIMO mode to using them in a diversity antenna mode.

The technology described in more detail below dynamically applies correlation matrices that can represent the scenarios in FIGS. 2A-B. A bank of 8 matrices, for instance might include two outside, two inside and four transitional matrices. The matrices can be applied in turn to emulate entry into the building. For a cell phone that changes orientation, matrices could represent different alignments of the cell phone antennas to the transmission antennas. As the cell phone gyrates along any of its x, y, z axes, a changed correlation matrix can be applied to represent the relationship between the cell phone antennas and the base station.

Dynamic Complex Correlation

Dynamic Complex Correlation enables the user to dynamically switch between sets of correlation matrices using a real-time dynamic environment engine (DEE). In one embodiment, 24 multipathing subchannels are supported for each logical channel in a 2×2 MIMO configuration. In other configurations, four, 8, 10 and even 16 test units, each handling a 2×2 MIMO test, have been combined into a single system. The multiple units have been used to test a single cell phone or to test multiple devices ("DUTs" for devices under test) in parallel. Sixteen test units can produce a combined signal that requires the DUT to select among sixteen simulated base stations. Applicants believe that providing a synchronized time base to multiple test units should, in the future, allow simulation of a cell phone exposed to 32 or even 64 base stations.

To support the required throughput, FPGAs handle a few pathways each. Multiple units carry banks of FPGAs to handle as many pathways as required. Applying a classical model with power and delay parameters in correlation matrices, the logical channels from multiple transmission antennas to a particular cell phone antenna can be combined before using the FPGA to apply the correlation matrices. Then, two paths can be calculated by the same FPGA and 24 paths for each of four logical channels can be processed using twelve FPGAs, using the general structure illustrated by FIG. 3. Of course, the number of paths handled by a single FPGA is a function of the capability and cost of an FPGA device. As FPGAs improve in capability and fall in cost, the number of FPGAs required to process a particular number of paths and correlation matrices will decrease.

A real-time dynamic environment engine may process 2×2, 4×2, 4×4 or other MIMO correlations. The 2×2 and 4×2 configurations have been tested and the 4×4 configuration is under development. An initial test system has been able to support up to eight sets of 2×2 MIMO matrices using twelve FPGAs per 2×2 MIMO. Combine the paths and then delay them. Two paths from the two transmission antennas have the same delay. Future systems will be able to support more extensive correlation matrices, both in number of matrices and number of antennas. The initial system switches between correlation matrices at least once per second. Future systems will be able to switch more rapidly.

Figure 3:
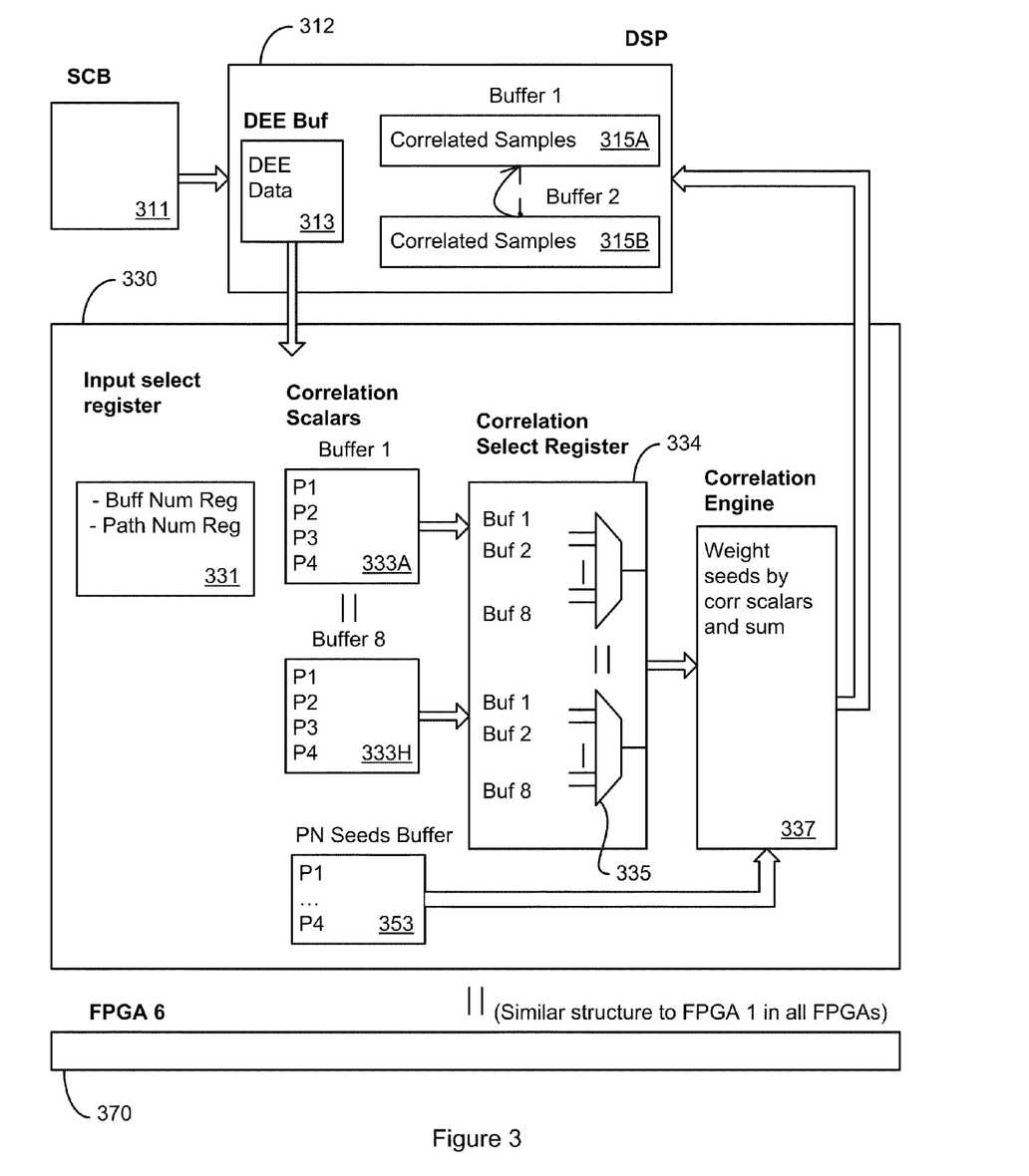
FIG. 3 is a high-level block diagram of a data interface, a digital signal processor and a bank of FPGAs.

FIG. 3 is a high level block diagram of a data interface 311, a digital signal processor 312 and a bank of FPGAs 330, 370. The data interface 311 supplies control and test data to the DSP 312.

Correlation matrices are configured and supplied through the data interface 311 and buffered in a DEE buffer 313. A set of matrices typically includes 24 matrices for 24 paths. Eight, ten or more sets of correlation matrices can be used, as memory and memory loading time permit. The DSP also supplies one or more seeds for channel emulation. These seeds provide a starting point for pseudo random sequence, such as pseudo-random binary sequence (PRBS). Channel conditions are generated stepping through the pseudo random sequence. In the embodiment illustrated, the DSP 312 controls buffering of the correlation matrices to the bank of FPGAs 330-370. The DSP also processes signals, as further explained below.

Sample FPGA 330 includes an input select register 331, correlation scalar buffers 333A-H, path seed buffers 353, at least one correlation select register 334, selectors 335, and a correlation engine 337. The input select register may include buffer number and path number registers. These registers are used when the FPGA is loaded to direct data to the buffers 333 and paths. In the figure, 24 paths are accommodated on six FPGAs, each FPGA processing four paths. In practice, the number of paths per FPGA may be doubled, applying the strategy above. In operation, an FPGA may use a circular buffer to implement delay factors. The buffer can be applied to multiple paths. Paths can be processed in pairs, to the extent that they share delay characteristics so that the contributions of various paths can be combined before delay factors are applied.

FPGA buffers are provided for correlation scalars 333A-H. These buffers are loaded with the correlation scalars, which may be complex scalars for delay and power, which modify the instantaneous phase and amplitude of a signal. The buffers are coupled to selectors 335, which are controlled by at least one selection register 334. In some implementations, multiple selection registers are implemented, which typically will be loaded to make the same selection, so that a consistent set of matrices is selected for all paths. However, multiple selection registers could be manipulated individually, if some paths were intended to change but not others.

Selected 335 correlation scalars and seeds 353 for the paths being processed are combined in a correlation engine 337. The correlation engine multiplies the weight seeds by the correlations scalars and sums across the paths. Paths processed by the various FPGAs 330, 370 can be combined in one FPGA or passed to the DSP 312 for summation. Multiple buffers 315A-B in the DSP process correlated samples. The DSP uses the summation of correlation coefficients to model the channel(s) and modify the signal(s).

Figure 4A:
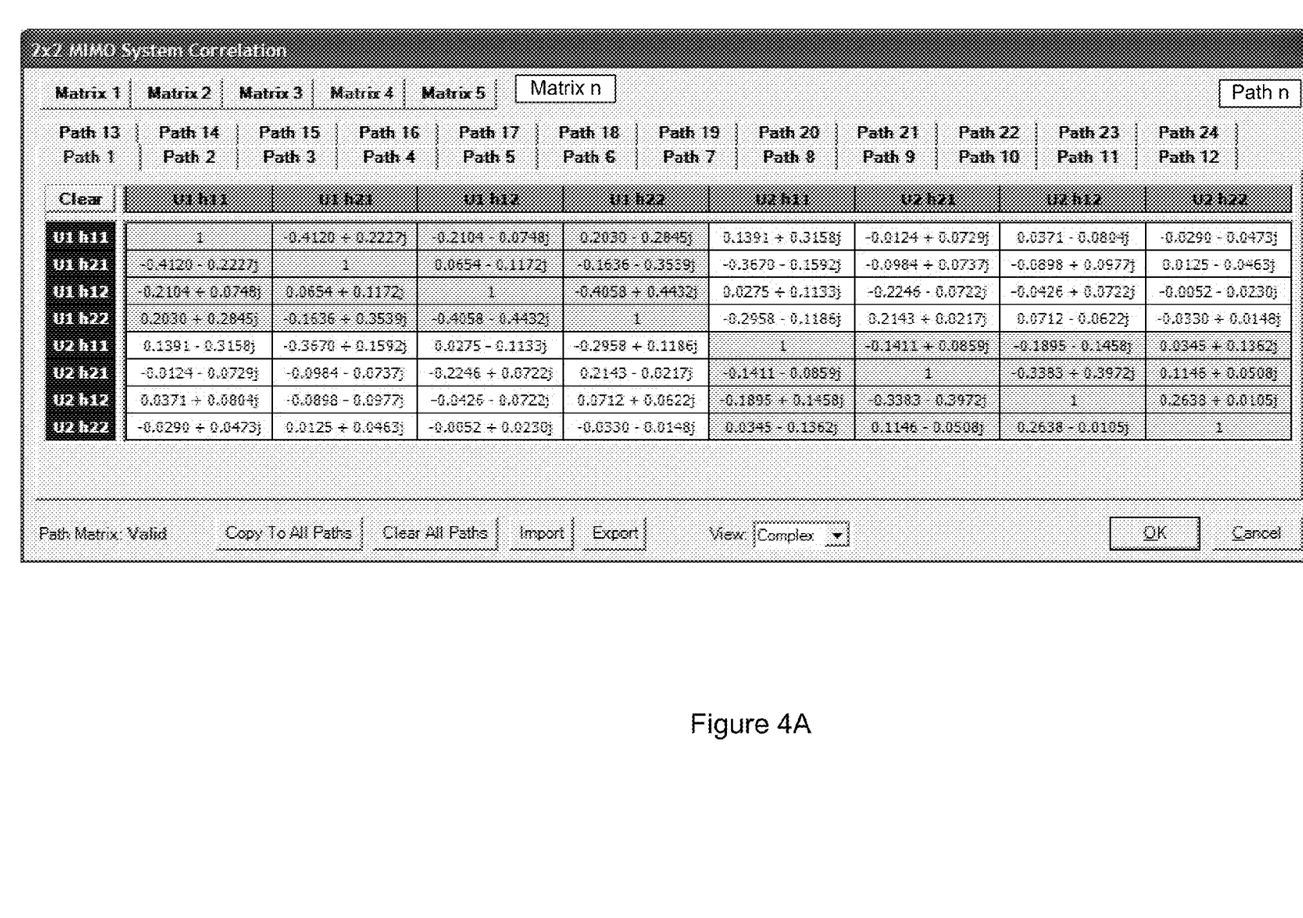
FIGS. 4A-C provide sample GUIs for entry of correlation scalars for one path of one set of correlation matrices.
Figure 4B:
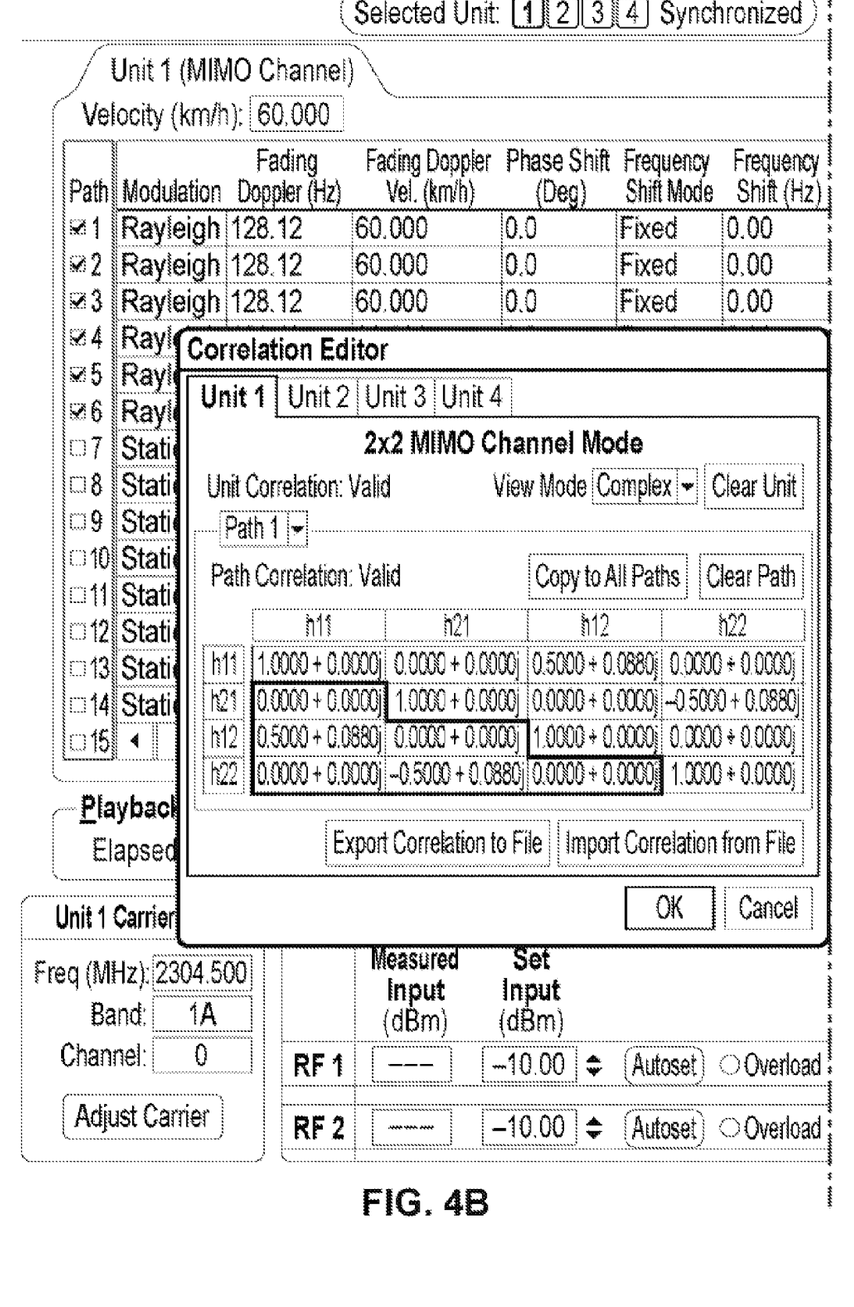
Figure 4C:
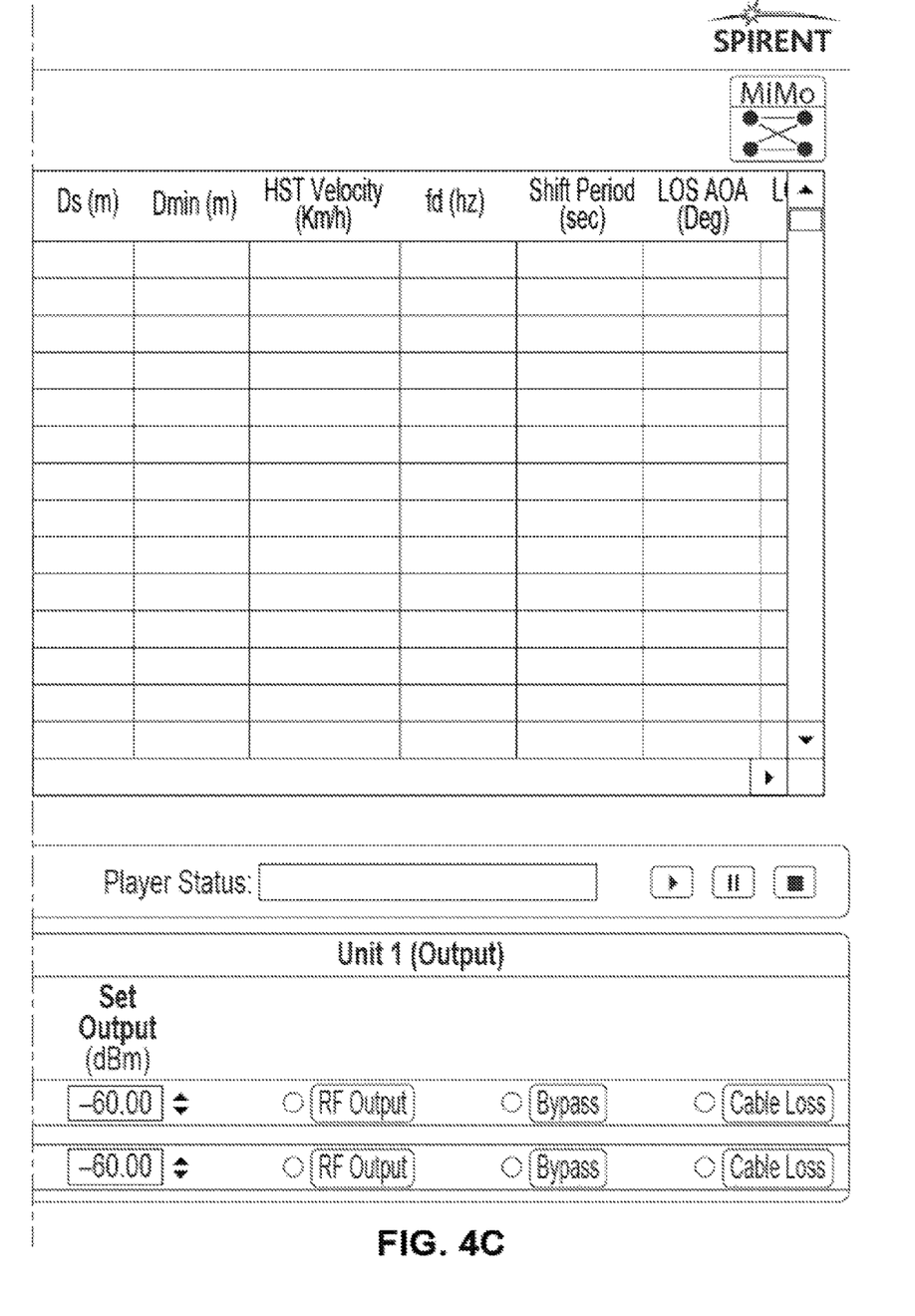

FIG. 4A provides a sample GUI for entry of correlation scalars for one path of one set of correlation matrices. More than the 24 paths illustrated and more than 5 matrices illustrated could be used, as FPGA memory and/or load times permit. After data entry, the matrices are compiled and the actual content of the correlation file is validated.

Figure 5:
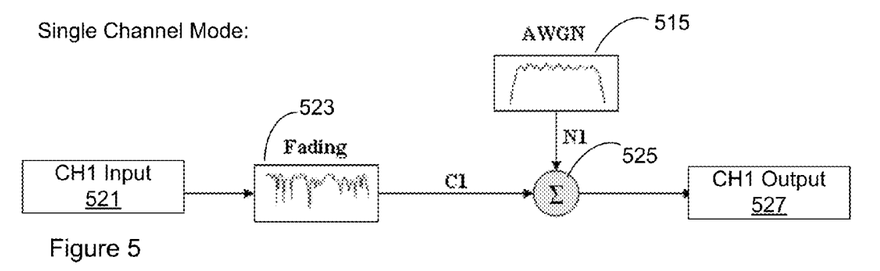
FIGS. 5-10 are high-level block diagrams of channel modes to which a channel emulator may apply correlation matrices. These include single channel, dual channel, RX diversity, TX diversity, 2×2 MIMO, and 4×4 MIMO modes.
Figure 6:
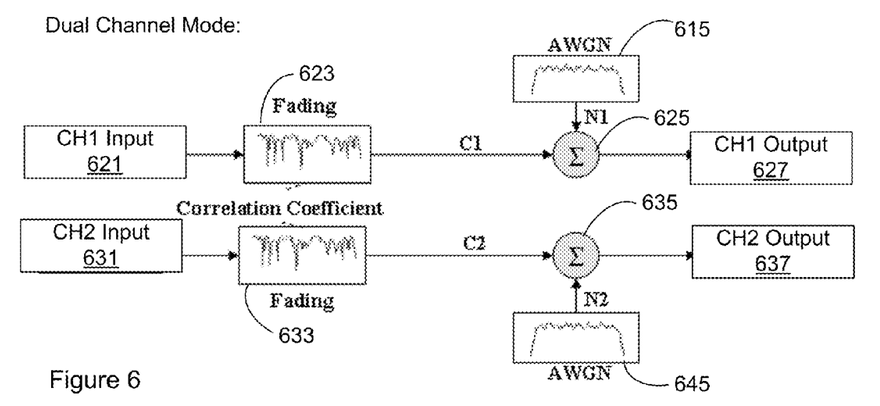
Figure 7:
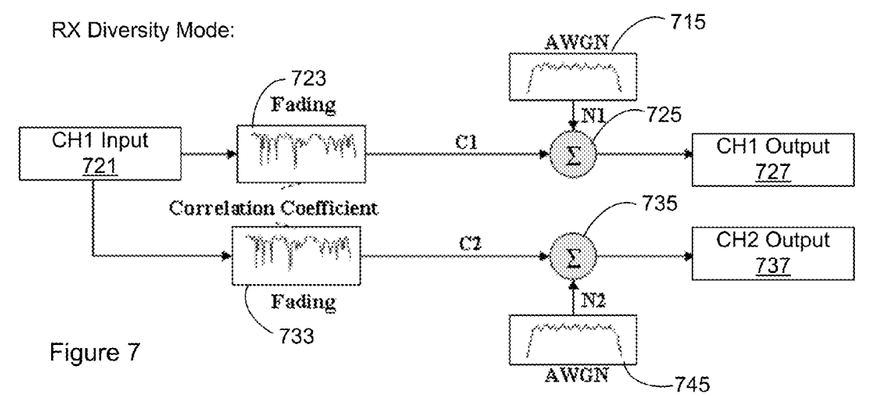
Figure 8:
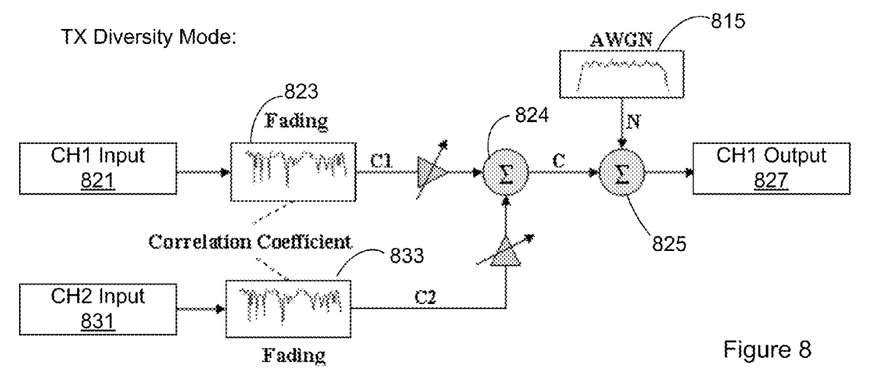
Figure 9:
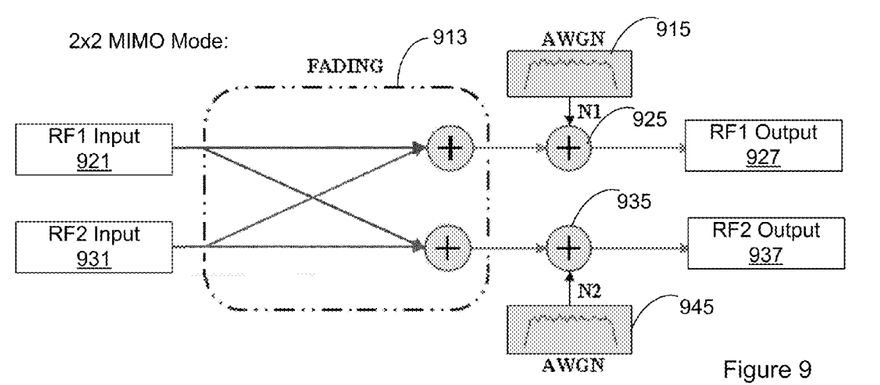
Figure 10:
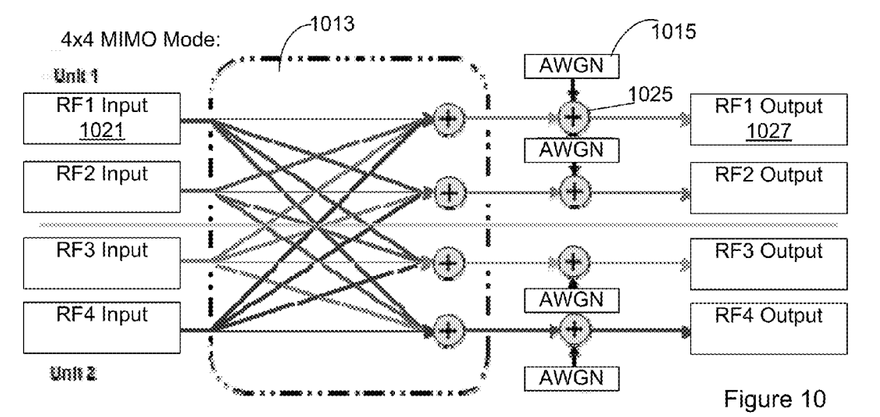

Several channel modes can be supported by a channel emulator, applying correlation matrices. These include single channel, dual channel, RX diversity, TX diversity, 2×2 MIMO, 4×2 MIMO and 4×4 MIMO modes, as illustrated in FIGS. 5-10. The 4×2 MIMO mode is not separately illustrated, but can be taken from FIG. 10 as four RF inputs 1021 and just two RF outputs (for two base stations to a cell phone.) In this context, "diversity" and "MIMO" indicate how signals on multiple antennas are processed before being combined upon receipt or transmitted. As desired, additional MIMO modes can be configured and tested. In these figures, parallel numbers are used for parallel features to the extent practical, e.g., x21 for channel 1 input, as in 521, 621, 721, 821. The mode is selected at a user interface or API. In FIG. 5, setting the Channel Configuration to Single provides a single channel with 24 paths. The other channel is automatically bypassed using the RF Bypass feature. In FIG. 6, setting the Channel Configuration to Dual provides two channels, each having 12 Paths. In FIG. 7, setting the Channel Configuration to RX Diversity provides two channels, each having 12 paths. The input to RF port 1 is split out and distributed to both channels. In FIG. 8, setting the Channel Configuration to TX Diversity provides two channels, each having 12 paths. The inputs to both RF ports are faded and then summed together. In FIG. 9, setting the Channel Configuration to 2×2 MIMO provides four sub-channels, each having 24 Paths. The inputs to both RF ports are faded and summed together, as shown in FIG. 9. In 2×2 MIMO mode, each channel (h11, h21, h12, h22) has the same power delay profile as the other channel. This mode is available when the appropriate hardware and software options are installed. In FIG. 10, setting the Channel Configuration to 4×4 MIMO provides sixteen sub-channels, each having 24 Paths. The horizontal line in FIG. 10 indicates that the logical channels to represent two base stations and two cell phones. The inputs to all four RF ports are faded and summed together, as shown in the figure. In 4×4 MIMO mode, all sub-channels (hij; i: 1-4; j: 1-4) have the same power delay profile. This mode is available when the appropriate hardware and software options are installed.

In FIGS. 5-8, one input channel 521, 621, 721, 821 is processed and sometimes a second input channel 631, 831. Fading and correlation calculations are applied 523, 623, 633, 723, 823, 833. The dynamic correlation technology disclosed is applied to the MIMO configurations. Additive white Gaussian noise 515, 615, 645, 715, 745, 815 or some other noise or interference is summed 525, 625, 635, 725, 735, 825 with the calculated channel to produce one or two channel outputs 527, 627, 637, 727, 737, 827. In the transmit diversity mode of FIG. 8, channels C1 and C2 are adjusted in amplitude and summed 824 before being combined with the noise 825.

FIGS. 9-10 include networks of signal paths 913, 1013 for MIMO configurations. Multiple inputs, e.g., 921, 931 represent signals from multiple antenna. The inputs cross paths and are combined in the networks 913, 1013. Noise 915, 945, 1015 is combined with the signals 925, 935, 1025 to produce the outputs 927, 937, 1027.

Our new dynamic testing of transitions between channel conditions, by dynamically switching among correlation matrices during a single test, extends prior functions of a DEE. It provides a new testing capability that is useful, for instance, in evaluating a cell phone's adaptation to a changed environment. Switching correlation matrices affords a different quality of testing than simple fading from one base station to the other.

For compatibility, templates of the prior DEE can be given additional column to allow users to specify a file name and path to a correlation file exported from a correlation window. The file name can be displayed in the Correlation Matrix column and a path relative to other test files, which allows users to put correlation matrix files in the same folder as other test files. To avoid confusion, users can be required to browsed to files, rather than manually typing of path/file names.

Testing using Spirent's SR5500 Wireless Channel Emulator currently requires multiple units for some test configurations. When multiple units are in use, the timing for switching among correlation matrices specified for a given state on Unit 1 can be applied to all units in the test suite, when the units are organized into a suite. In that case, timing for switching specified for Unit 2, 3, or 4 would be ignored and superseded by the timing specified on Unit 1.

A channel emulator may support a variety of suite and channel mode combinations. The initial release of the Dynamic Complex Correlation technology supports suite/channel mode combinations and imposes restrictions on the contents of the correlation files as follows:

Single-unit, Single-channel mode, unsynchronized: In this context, "unsynchronized" is redundant with single-unit, as there are no two units synchronize. There is no correlation in this mode, because correlation expresses the relationship among signals exchanged among pairs of antenna. Single channel refers to a single logical channel, which means one transmitting antenna and one receiving antenna at a time.

Single-unit, Dual Transmit/Receive Diversity Antenna mode, unsynchronized: One value is used for correlation when antennas are used in a diversity antenna mode. The compiler expects a correlation file in a "one unit one value" format.

Single-unit 2×2 MIMO mode, unsynchronized: Correlation data is entered for 24 of the 4×4 matrices. The DEE Compiler expects a correlation file that is in "one unit 24 path 4×4 matrix" mode.

Multi-unit, Single-channel, synchronized, instrument-based mode: There is no correlation between antennas in this mode, because a single logical channel is being tested.

Multi-unit, Dual Transmit/Receive Diversity Antenna, synchronized, instrument-based mode: Again, one value is used for correlation when antennas are used in a diversity antenna mode. In instrument-based mode, exported files will be in "one unit one value" mode. Correlation files specified on the $2^{nd}$, $3^{th}$, and/or $4^{th}$ unit apply. The DEE Compiler expects the correlation files to be in "one unit one value" mode, otherwise, compile fails.

Multi-unit, 2×2 MIMO, synchronized, instrument-based mode: Correlation data is entered for 24 of the 4×4 matrices. Because it's Instrument-based mode, exported files will be in "one unit 24 path 4×4 matrix" mode. Correlation files specified on the $2^{nd}$, $3^{rd}$, and/or $4^{th}$ unit apply.

Multi-unit, Single-channel, synchronized, suite-based mode: In this context, suite-based mode means that multiple test units are grouped together to respond to a single set of commands. Correlation data is entered for a 2×2, 3×3, or 4×4 matrix depending on the number of units participating in the test.

Exported files will be in "one unit 24 path 2×2 matrix" or "one unit 24 path 3×3 matrix" or "one unit 24 path 4×4 matrix" mode (depending on the number of units).

Because it's Suite-based mode, only timing specified on the $1^{st}$ unit applies.

DEE Compiler expects correlation files to be in "one unit 24 path 2×2 matrix" or "one unit 24 path 3×3 matrix" or "one unit 24 path 4×4 matrix" mode (depending on the number of units). If not, compile fails.

Multi-unit Dual/Tx/Rx Div Sync Suite-based mode:

Correlation Window in the TestKit GUI will contain a 4×4, 6×6, or 8×8 depending on the number of units.

Exported files will be in "one unit 12 path 4×4 matrix" or "one unit 12 path 6×6 matrix" or "one unit 12 path 8×8 matrix" mode (depending on the number of units).

Because it's Suite-based mode, only timing specified on the $1^{st}$ unit applies.

DEE Compiler could accept correlation files in "one unit 12 path 4×4 matrix" or "one unit 12 path 6×6 matrix" or "one unit 12 path 8×8 matrix" mode (depending on the number of units). If not, compile fails.

Multi-unit 2×2 MIMO Sync Suite-based mode:

Correlation Window in the TestKit GUI could contain a 4×4, 8×8, 12×12, 16×16, or 32×32 matrix depending on the number of units. Other matrix sizes also could be supported.

Exported files could be in "one unit 24 path 8×8 matrix" or "one unit 24 path 12×12 matrix" or "one unit 24 path 16×16 matrix" mode (depending on the number of units).

Because it's Suite-based mode, only timing specified on the $1^{st}$ unit applies.

DEE Compiler could accept correlation files in "one unit 24 path 8×8 matrix" or "one unit 24 path 12×12 matrix" or "one unit 24 path 16×16 matrix" mode (depending on the number of units).

After specifying correlation matrices and other test configuration information, the user clicks "Enable" to invoke the compiler. If new data entry requires compilation, the compiler proceeds in two passes: In Pass 1, it parses the correlation file column and creates an internal table mapping file names to the table array index, which becomes the matrix index embedded in the correlation matrix ("SMC") file. Pass 2 is the compile as usual with the exception that the matrix indices are now embedded in the SMC file. Pass 2 enforce the system limit on how quickly matrixes are not allowed to change. In an early embodiment, the limit was not more frequently than once per second. The Compiler traverses its internal table mapping, reads in the correlation files, and creates and sends commands to the respective test units to prime the cluster FPGA memory blocks for DEE.

Sometimes, new data entry does not require full compilation, for instance, when the SMC, STB (simulation script), and API are all a matched set and the matrix indices specified in SMC file are valid. In a single pass, the compiler parses the correlation file column and creates an internal table mapping file names to the table array index. It then traverses the internal table mapping and proceeds as described above.

For backward compatibility, the DEE reads older STB files in the SSX format. An emulation file format called SSX, a proprietary XML-based format was previously used, but discontinued due to large file sizes.

Design Details

GUI

The graphic user interface builds upon an existing Correlation screen and its error checking, as illustrated in FIG. 4A. For the initial release, up to 8 matrices per unit in instrument-based mode, and 8 matrices for the suite in suite-based mode, would be set and saved via the Correlation screen interface. These matrices would be stored in the API and be saved as part of the WCE file. The DEE file will select these matrices using an index.

API

The application program interface has extended correlation matrix storage to be able to index 8 matrices per unit in instrument-based mode and 8 or more matrices in suite-based mode. More matrices could be handled as memory and load time permit.

RPI

The remote programming interface ("RPI") command language includes an extended correlation matrix command that indexes among matrices. An active matrix index command is also added.

In the suite-based example, a suitable new command definition would be as follows (only change being the '#'):
[SUITe:]CORRelation:MATRix#[:ALLpaths] <real list>

An example of a valid command would be:
CORR:MATR5:PATH17 <real list of values>

It would be backwards compatible because CORR:MATR would still refer to MATRIX 1 by default and the 'active matrix' will need to default to 1.

Some Particular Embodiments

The present invention may be practiced as a method or device adapted to practice the method. The invention may be an article of manufacture such as computer readable storage media impressed with logic to carry out computer-assisted testing of cell phones that have multiple antennas.

Figure 11:
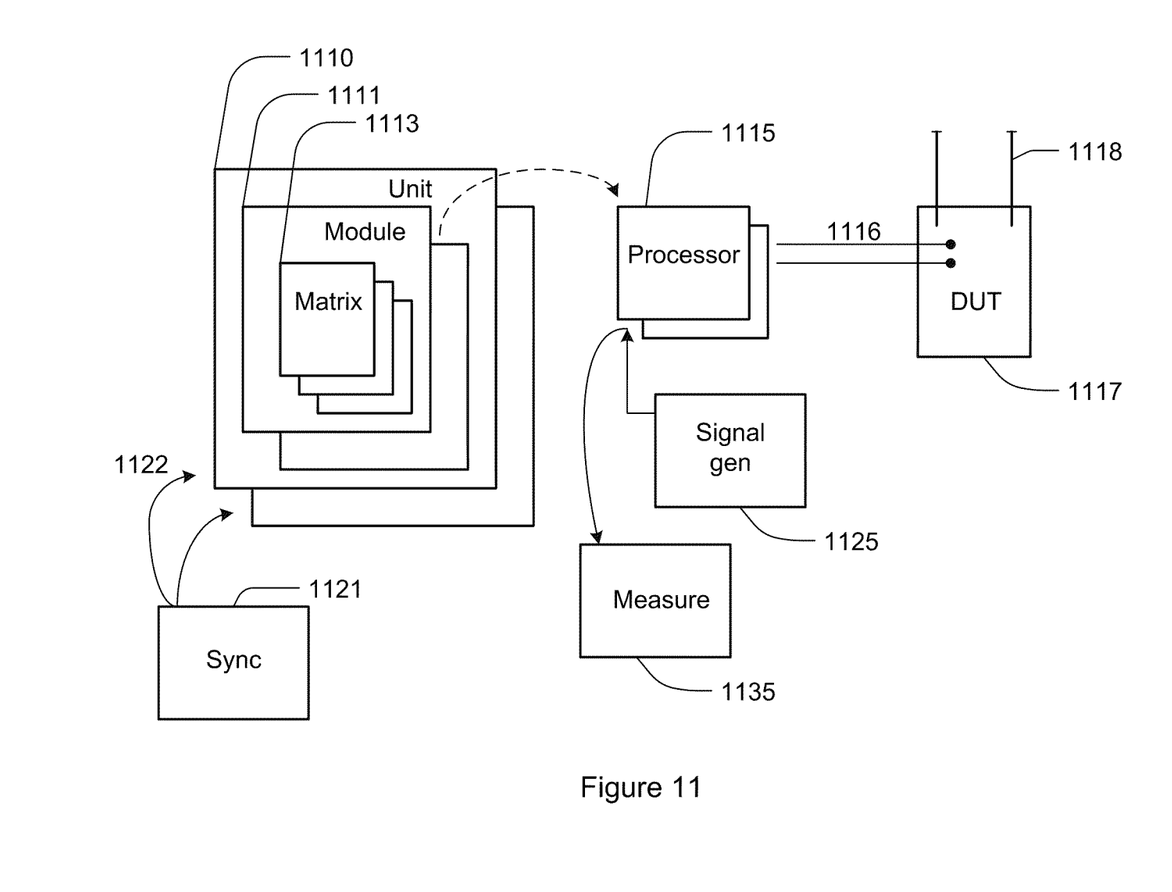
FIG. 11 is a high level block diagram of a device and method useful to test a cell phone with multiple antennas.

A method, illustrated by FIG. 11, of testing handset designs 1117 that use multiple handset antennas 1118. The method involves conducting a test using one or more channel generator modules 1111 running on one or more processors 1115. Optionally, the multiple channel generator modules and processors may be distributed into multiple test units 1110. The test units may, in turn, be combined into an overall system. The test uses at least three correlation data sets 1113 stored in memory to emulate different channel conditions of a propagation channel model (abbreviated "PCMs"), the different channel conditions representing time-varying physical relationships between multiple base station antennas and the multiple cell phone antennas. FIGS. 2A-B. The test applies each of the different channel conditions to a test signal that is fed to the device under test on the signal feed 1116. The test signal may be generated by signal generator 1125 that is separate from or integrated into the channel emulator or it can be generated by a real device, such as a base station. The method further includes measuring response 1135 of the handset 1117 to the different channel conditions.

Optionally, this method may include coupling at least one signal feed 1116 to a handset 1117 at a location that bypasses the handset antennas 1118.

Beyond applying different channel conditions of a PCM, the method may include applying multiple PCMs in the same test. For purposes of our claims, we distinguish between PCMs and channel conditions within an PCM following the nomenclature used by 3GPP and IST's WINNER projects. Channel conditions define a number of paths which have at least delay and power characteristics in a classic channel model. An PCM generally describes combinations of paths used to emulate channel conditions for a prototypical environment. The PCMs may be represented in correlation matrices (1113 and FIG. 2B) of power and delay terms. Alternatively, this method may further including changing emulated propagation channel models during a single test, the changed PCMs emulating a cell phone moving from one environment to another. FIGS. 2A-B.

Following 3GPP's nomenclature, the emulated PCMs may be chosen from a set including at least Suburban Macro, Urban Macro and Urban Micro 3GPP propagation channel models. Following WINNER II, the correlation data sets that implement PCMs may be chosen from a set including propagation scenarios for indoor office/residential, indoor to outdoor, typical urban micro-cell, bad urban micro-cell, large indoor hall, outdoor to indoor microcell, line of sight feeder for rooftop to rooftop, line of sight feeder for street-level to street-level, line of sight feeder for below rooftop to street-level, non-line of sight feeder for above rooftop to street-level, non-line of sight fixed feeder links for one terminal at near rooftop, suburban, typical urban macro-cell, bad urban macro-cell, outdoor to indoor macro-cell, rural macro-cell, and moving network WINNER II models.

Testing according to this method may further include using a plurality of channel generator modules 1111 running on respective ones of the processors 1115, supplying 1122 a synchronized time base 1121 to the channel generator modules 1111 and applying synchronized channel condition contributions from the channel generator modules 1111 to the test signal 1125. The synchronized time base 1121 is particularly useful when multiple units 1110 are combined for a test.

In this method, emulating the different channel conditions may includes emulating multipathing (FIG. 2A) between pairs of base station antennas and the handset antennas.

The emulating the different channel conditions may further include representing multiple base stations that each have multiple base station antennas and emulating movement of the cell phone between a first base station and a second base station.

A variety of more conventional channel condition emulations can be combined with the method, aspects and options described above. The different channel conditions may include emulating fast fading, shadowing, and channel noise, such as an interferer. FIGS. 5-10.

Emulating the different channel conditions may further includes using at least eight, ten, sixteen or more correlation data sets stored in memory 1113 to emulate different channel conditions of one or more PCMs. FIGS. 2A-B.

In addition to disclosing methods, we disclose systems. One such system is a system used to test a handset 1117 that uses multiple handset antennas 1118. The system includes at least one signal feed 1116 adapted to be coupled to the handset 1117 at a location that bypasses the handset antennas 1118, at least one memory; and one or more channel generator modules 1111 running on one or more processors 1115. The channel generator modules are coupled to the signal feed 1116 and the memory. Each channel generator module 1113 uses at least three correlation data sets 1111 stored in the memory to emulate different channel conditions of a propagation channel model (abbreviated "PCMs"), the different channel conditions representing time-varying physical relationships (FIGS. 2A-B) between multiple base station antennas and the multiple cell phone antennas. Each channel generator module 1111 applies the different channel conditions 1113 to a test signal 1125 and passes the conditioned test signal to the signal feed.

The system further includes a measurement module 1135 running on one or more of the processors 1115, coupled to the signal feed 1116, that measures response of the handset 1117 to the conditioned test signal.

In some implementations of the system, the processors 1115 are FPGAs 330, 370. The correlation data sets 1113 represent a plurality of paths between parings of base station antennas and cell phone antennas. Subsets of the paths are assigned to respective channel generator modules 1111, which run on respective FPGAs 1115. This assignment of paths to multiple processors could also be executed on a different processor design, such as a GPU or CPU.

One aspect of this system is the option for the channel generator modules 1111 to iterate over a plurality of PCMs in a single test. In some iterations over PCMs, the progression of PCMs represents the cell phone moving from one environment to another. FIG. 2A. Other progressions represent the cell phone moving between first and second base stations or a cell phone's orientation towards the base station changing. FIG. 2B.

The PCMs may conform to the standards for 3GPP SCMs or the PCMs of the ITS WNNER projects. One version includes among the PCMs available for emulation at least Suburban Macro, Urban Macro and Urban Micro models conforming to 3GPP propagation channel models. Another version includes as PCMs available for emulation representing at least indoor office/residential, indoor to outdoor, typical urban micro-cell, bad urban micro-cell, large indoor hall, outdoor to indoor microcell, line of sight feeder for rooftop to rooftop, line of sight feeder for street-level to street-level, line of sight feeder for below rooftop to street-level, non-line of sight feeder for above rooftop to street-level, non-line of sight fixed feeder links for one terminal at near rooftop, suburban, typical urban macro-cell, bad urban macro-cell, outdoor to indoor macro-cell, rural macro-cell, and moving network models in conformance with WINNER models.

Some system implementations include a plurality of channel generator modules 1111 running on a plurality of the FPGAs 1115 and a synchronized time base generator 1121 coupled to the channel generator modules to supply 1122 a synchronized time base. This improves multipathing emulation.

Either the channel generator modules or an additional emulation component may emulate a number of more conventional channel characteristics, including fast fading, shadowing, and channel noise/interferers. FIGS. 5-10.

The number of correlation data sets 1111 stored in memory may be expanded as memory and transfer time permit. Some embodiments will include at least eight, ten or sixteen correlation data sets stored in memory that emulate different channel conditions of one or more PCMs.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods of testing cell phones that have multiple antennas, systems including logic and resources to test cell phones that have multiple antennas, systems that take advantage of computer-assisted testing of cell phones that have multiple antennas, computer readable storage media impressed with logic to carry out testing of cell phones that have multiple antennas, computer readable transmission media carry data streams impressed with logic to test cell phones that have multiple antennas, computer readable storage media impressed with logic to that can be combined with a system including one or more processors and memory to create any of the systems described above that test cell phones that have multiple antennas, computer readable transmission media carry data streams impressed with logic to that can be combined with a system including one or more processors and memory to create any of the systems described above, or computer-accessible services that carry out computer-assisted testing of cell phones that have multiple antennas. It is contemplated that modifications and combinations will readily occur to those skilled in the art, which modifications and combinations will be within the spirit of the invention and the scope of the following claims.

We claim as follows:

1. A system used to test a cell phone that uses multiple cell phone antennas, including:
    at least one signal feed adapted to be coupled to the cell phone at a location that bypasses the cell phone antennas, whereby the cell phone performs multiple-input/multiple output, abbreviated MIMO, processing of multiple signals from the multiple cell phone antennas;
    at least one memory; and
    one or more channel generator modules running on one or more processors, coupled to the signal feed and the memory, wherein each channel generator module:
    uses at least three correlation data sets stored in the memory to emulate different channel conditions of a propagation channel model (abbreviated "PCM"), the correlation data sets representing time-varying reorientation of the multiple cell phone antennas; and
    conditions a test signal with the different channel conditions and passes the conditioned test signal to the signal feed; and
    a measurement module running on one or more of the processors, coupled to the signal feed, that measures response of the cell phone to the conditioned test signal.

2. The system of claim 1, wherein the processors are FPGAs.

3. The system of claim 2, wherein the correlation data sets represent a plurality of paths between each paring between the multiple base station antennas and the multiple cell phone antennas and subsets of the paths are assigned to respective channel generator modules running on respective ones of the FPGAs.

4. The system of claim 2, further including a plurality of channel generator modules running on a plurality of the FPGAs and a synchronized time base generator coupled to the channel generator modules to supply a synchronized time base.

5. The system of claim 2, wherein the channel generator modules or another emulation component emulates fast fading.

6. The system of claim 2, wherein the channel generator modules or another emulation component emulates shadowing.

7. The system of claim 2, wherein the channel generator modules or another emulation component emulates channel noise.

8. The system of claim 2, further including at least eight correlation data sets stored in memory that emulate the different channel conditions of the PCM.

9. The system of claim 1, wherein the channel generator modules iterate over a plurality of PCMs in a single test.

10. The system of claim 9, wherein the plurality of PCMs represent the cell phone moving from one environment to another.

11. The system of claim 9, wherein the plurality of PCMs represent the cell phone moving between first and second base stations.

12. The system of claim 9, further including as PCMs available for emulation at least Suburban Macro, Urban Macro and Urban Micro models conforming to 3GPP propagation channel models.

13. The system of claim 9, further including as PCMs available for emulation representing at least indoor office/ residential, indoor to outdoor, typical urban micro-cell, bad urban micro-cell, large indoor hall, outdoor to indoor microcell, line of sight feeder for rooftop to rooftop, line of sight feeder for street-level to street-level, line of sight feeder for below rooftop to street-level, non-line of sight feeder for above rooftop to street-level, non-line of sight fixed feeder links for one terminal at near rooftop, suburban, typical urban macro-cell, bad urban macro-cell, outdoor to indoor macro-cell, rural macro-cell, and moving network models in conformance with WINNER models.

14. A method of testing new cell phone designs that use multiple cell phone antennas, including:
   coupling at least one signal feed to a cell phone at a location that bypasses the cell phone antennas, whereby the cell phone performs multiple-input/multiple output, abbreviated MIMO, processing of multiple signals from the multiple cell phone antennas; and
   conducting a test using one or more channel generator modules running on one or more processors, including:
      using at least three correlation data sets stored in memory to emulate different channel conditions of a propagation channel model (abbreviated "PCMs"), the correlation data sets representing time-varying reorientation of the multiple cell phone antennas; and
      applying each of the different channel conditions to a test signal that is fed to the cell phone on the signal feed; and
      measuring response of the cell phone to the different channel conditions.

15. The method of claim 14, further including emulating a plurality of PCMs in a single test.

16. The method of claim 15, further including choosing the emulated PCMs from a set including environments representing at least Suburban Macro, Urban Macro and Urban Micro 3GPP propagation channel models.

17. The method of claim 14, further including choosing one or more PCMs to emulate from a set including environments representing at least indoor office/ residential, indoor to outdoor, typical urban micro-cell, bad urban micro-cell, large indoor hall, outdoor to indoor microcell, line of sight feeder for rooftop to rooftop, line of sight feeder for street-level to street-level, line of sight feeder for below rooftop to street-level, non-line of sight feeder for above rooftop to street-level, non-line of sight fixed feeder links for one terminal at near rooftop, suburban, typical urban macro-cell, bad urban macro-cell, outdoor to indoor macro-cell, rural macro-cell, and moving network.

18. The method of claim 14, further including changing emulated propagation channel models during a single test, the changed PCMs emulating the cell phone moving from one environment to another.

19. The method of claim 14, further including using a plurality of channel generator modules running on respective ones of the processors, supplying a synchronized time base to the channel generator modules and applying synchronized channel condition contributions from the channel generator modules to the test signal.

20. The method of claim 14, wherein emulating the different channel conditions includes emulating multipathing between pairs of base station antennas and the cell phone antennas.

21. The method of claim 14, wherein emulating the different channel conditions includes representing multiple base stations that each have multiple base station antennas and emulating movement of the cell phone between a first base station and a second base station.

22. The method of claim 14, wherein emulating the different channel conditions includes emulating fast fading.

23. The method of claim 14, wherein emulating the different channel conditions includes emulating shadowing.

24. The method of claim 14, wherein emulating the different channel conditions includes emulating channel noise.

25. The method of claim 14, wherein emulating the different channel conditions includes using at least eight correlation data sets stored in memory to emulate the different channel conditions of the PCM.

* * * * *